No. 757,306. PATENTED APR. 12, 1904.
F. W. E. HEYSSEL.
EXTENSION BRACE.
APPLICATION FILED MAR. 2, 1903.
NO MODEL.
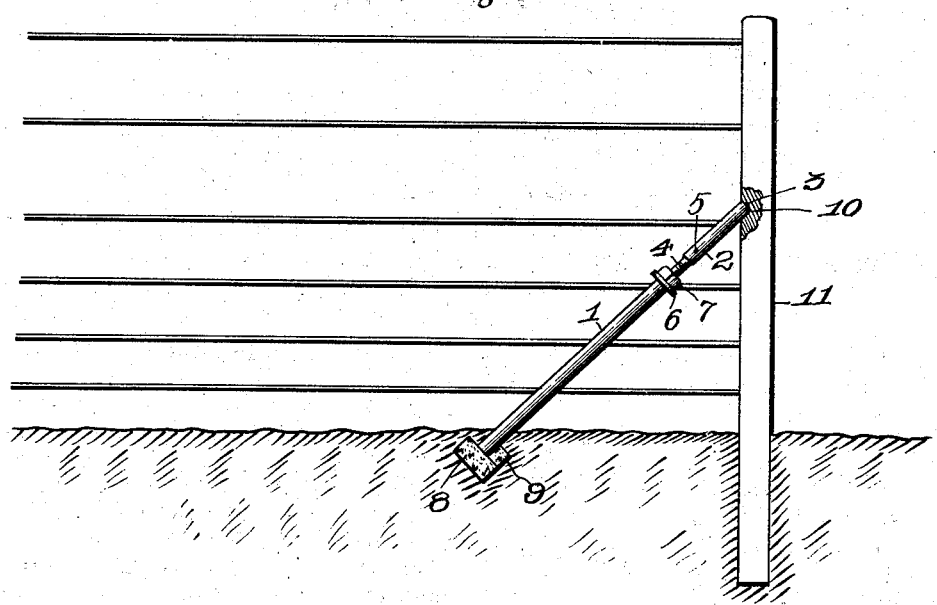
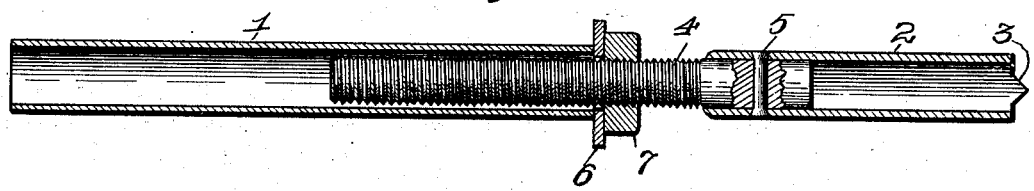

No. 757,306. Patented April 12, 1904.

UNITED STATES PATENT OFFICE.

FREDERICK W. E. HEYSSEL, OF PISGAH, MISSOURI.

EXTENSION-BRACE.

SPECIFICATION forming part of Letters Patent No. 757,306, dated April 12, 1904.

Application filed March 2, 1903. Serial No. 145,859. (No model.)

*To all whom it may concern:*

Be it known that I, FREDERICK W. E. HEYSSEL, a citizen of the United States, residing at Pisgah, Cooper county, in the State of Missouri, have invented certain new and useful Improvements in Extension-Braces, of which the following is a specification containing a full, clear, and exact description, reference being had to the accompanying drawings, forming a part hereof.

My invention relates to extension-braces; and it consists in the novel construction, combination, and arrangement of parts hereinafter specified and claimed.

The object of my invention is to provide an improved extension-brace adapted especially for use in supporting telephone and telegraph poles, fence-posts, and for use in locking the wheels and other parts of traction-engines to prevent vibration during operation.

In the drawings, Figure 1 is a view of my invention applied to a fence-post. Fig. 2 is a sectional elevation of my improved brace.

My improved brace is composed of two tubes 1 and 2. The tube 2 is provided at one end with one or more integral prongs or teeth 3 and at its opposite end with a screw 4. The screw 4 may be secured within the tube in any desired manner; but preferably it is welded therein and also secured by means of a lateral bolt or rivet 5, passing through the tube and base of the screw. The screw projects within the longer tube 1, and a washer 6 is loosely mounted upon said screw next adjacent to the inner end of said tube. A nut 7 is threaded upon said screw between said washer and the adjacent end of the short tube 2.

In operation in bracing a post of any kind the device is located at an angle, as shown in Fig. 1, with the lower end of the longer tube 1 resting upon the stone 8, while the smaller stone 9 is used to assist in supporting the said tube. The stones 8 and 9 are of course set into the ground a suitable distance. The upper end of the device having the prong 3 is seated within the recess 10, formed in the post 11. Said prong will prevent turning of the tube 2 when the nut 7 is rotated. After the device has been placed in position, as shown, the nut 7 should be rotated in proper direction, thereby forcing the tubes 1 and 2 farther apart and tightening the brace. When it is desired to remove the brace, the operation is reversed by loosening the nut 7.

It will be observed that the tubes 1 and 2 are separable, and the screw 4 may be readily removed from the longer tube.

What I claim is—

The improved extension-brace, comprising two non-revoluble tubes 1 and 2, a screw 4 extending within one end of the said tube 2, a bolt or rivet 5 extending through said tube and said screw and fixing the screw against rotation in the tube, and said screw projecting free from said tube 2 and adapted to slide loosely within the other tube, said screw-carrying tube having an integral means at its free end to prevent its rotation, a washer 6, and an angular wrench-movable separate nut 7 revolubly mounted upon said screw between said tubes and adapted to force said washer against the inner end of the said tube 1, to separate the two tubes, substantially as specified.

In testimony whereof I have signed my name to this specification in presence of two subscribing witnesses.

FREDERICK W. E. HEYSSEL.

Witnesses:
NICHOLAS J. BLANK,
PHILIP W. IMHOFF.